UNITED STATES PATENT OFFICE.

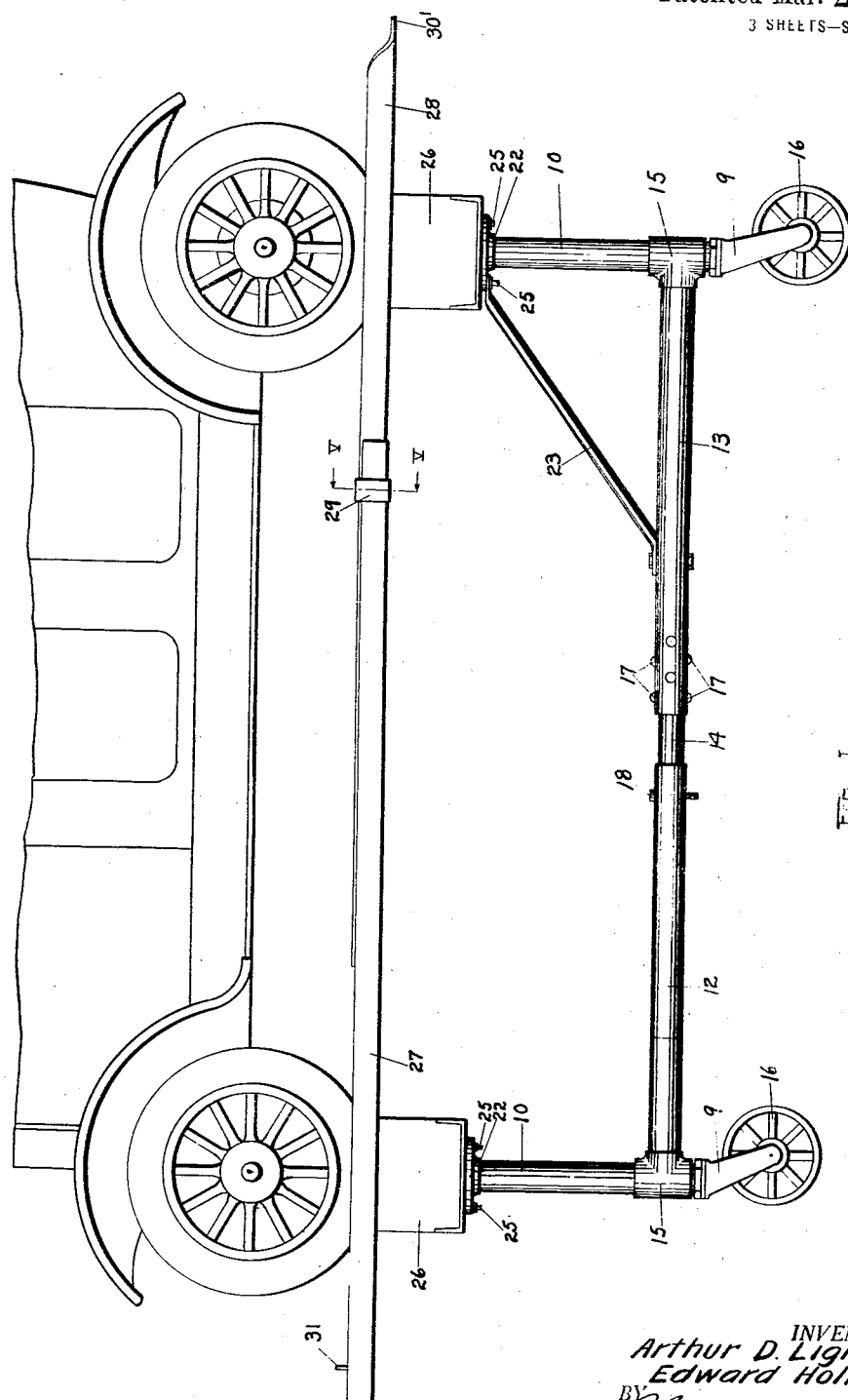

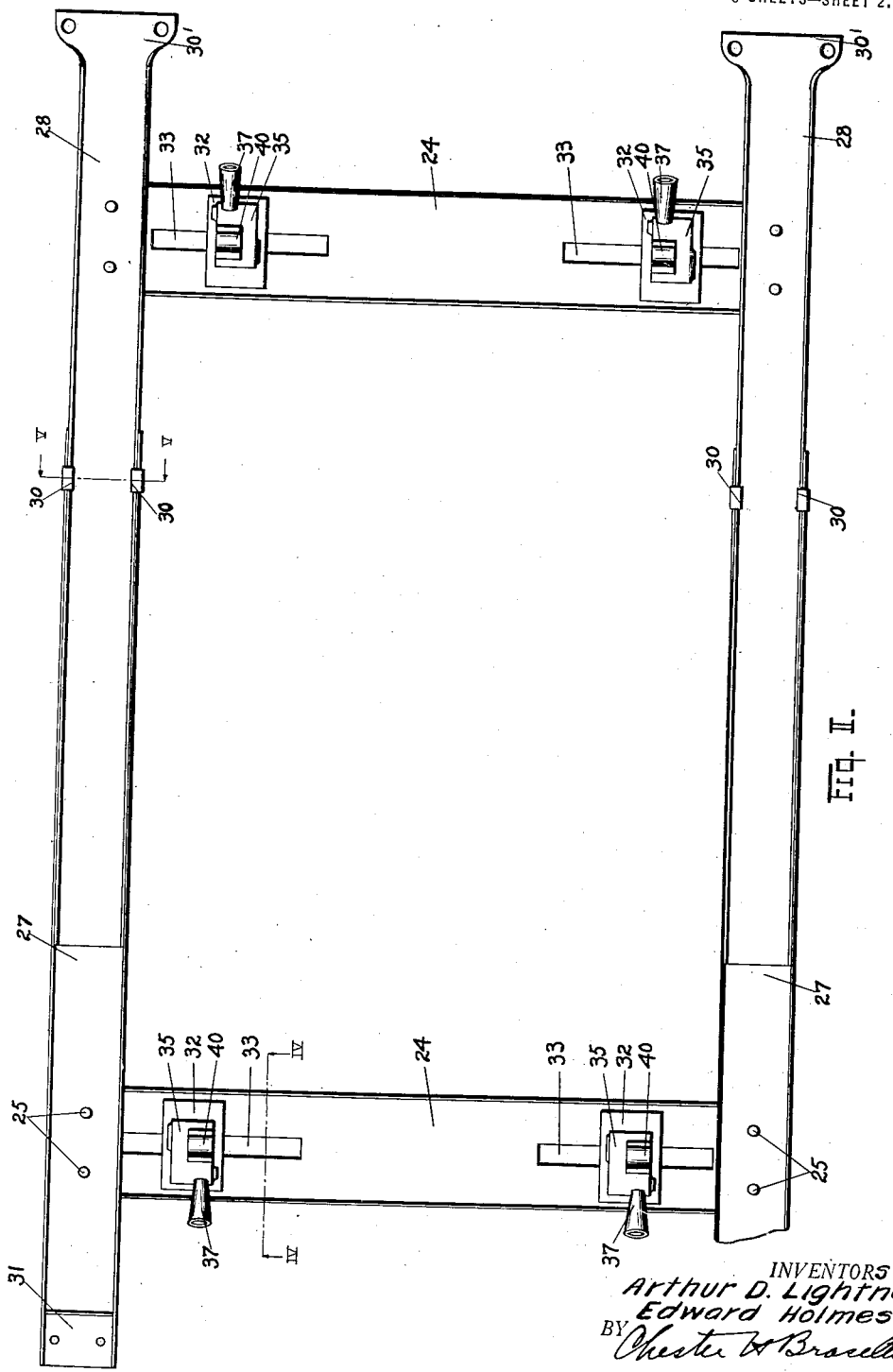

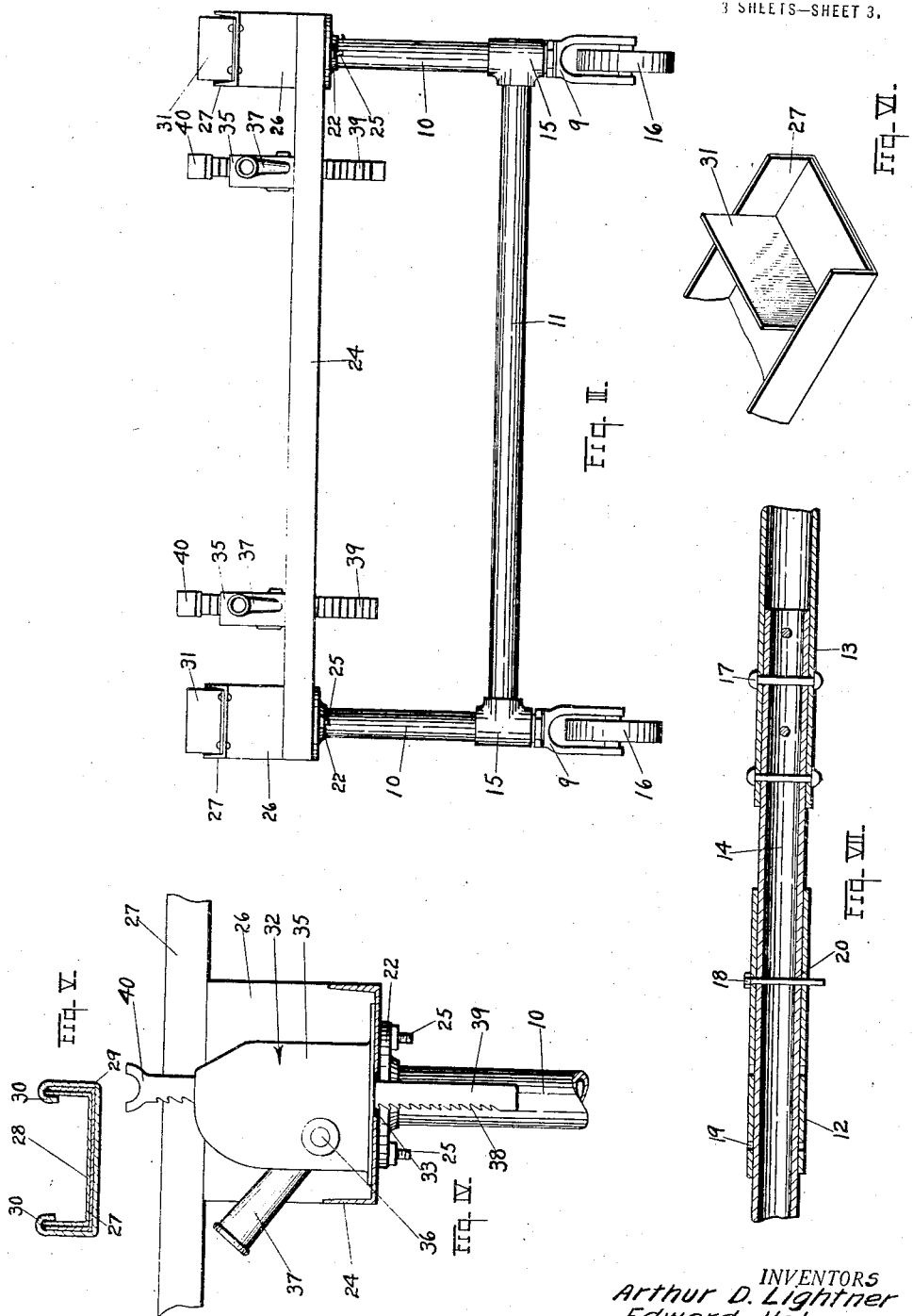

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

ELEVATING TRUCK.

1,410,103.

Specification of Letters Patent. Patented Mar. 21, 1922.

Application filed January 6, 1919. Serial No. 269,917.

*To all whom it may concern:*

Be it known that we, ARTHUR D. LIGHTNER and EDWARD HOLMES, citizens of the United States, residing at Toledo, county of Lucas, and State of Ohio, have invented certain new and useful Improvements in Elevating Trucks, of which we declare the following to be a full, clear, and exact description.

This invention relates to improvements in elevating trucks adapted for use in transporting vehicles from place to place, and elevating the same. It is more particularly adapted for use in connection with the loading and double-decking of automobiles in freight cars.

One object of this invention is to provide an improved truck which will greatly facilitate the operation and shorten the time necessary for loading automobiles in freight cars, particularly in cases where the automobile is raised to the upper part of the car and supported therein for the purpose of loading a second automobile beneath it.

A further object of this invention is to provide an improved truck so constructed as to readily receive an automobile from the dock and convey it to the car to be loaded without danger of injury to the automobile.

A further object of this invention is to provide means for hoisting the automobile into position for placing the blocking thereunder after it has been conveyed into the freight car.

Further objects, and objects relating to economies of manufacture and details of construction, will definitely appear from the detailed description to follow.

We accomplish the objects of our invention in one instance by the devices and means described in the following specification, but it is evident that the same may be varied widely without departing from the scope of the invention as pointed out in the appended claims.

A structure constituting one embodiment of our invention, which may be the preferred, is illustrated in the accompanying drawing, forming a part hereof, in which:

Figure I is a side elevational view of the improved truck, showing its position with relation to an automobile of the usual construction carried thereby.

Figure II is a top plan view of the truck, showing the position of the lifting jacks with relation to the channelled rails.

Figure III is an end elevation of the truck.

Figure IV is a side elevational view of one of the lifting jacks, taken along the line IV—IV of Figure II.

Figure V is a vertical sectional view, taken along the line V—V of Figures I and II.

Figure VI is a detailed perspective view of a portion of one of the channelled rails, showing the stop therein for limiting the movement of the automobile in one direction.

Figure VII is a vertical sectional view of a portion of one of the side rails of the frame portion.

In the drawings, similar reference characters refer to corresponding parts throughout the several views, and the sectional views are taken looking in the direction of the small arrows at the ends of the section lines.

Referring to the drawings, the base frame portion of the truck comprises a plurality of upright members 10, the front and rear pairs of which are connected together by transverse frame members 11, while the longitudinal side frame members comprise portions 12 and 13 connected to the front and rear standards respectively, the corresponding side members upon each side of the truck being united by a telescoping member 14. The upright standards and the frame members above described may be constructed of hollow tubing, the upright standards being provided with suitable couplings 15 adapted to receive and hold in proper position the ends of the transverse and longitudinal frame members. Each of the upright standards is preferably provided at its lower end with a forked bearing member 9, which may be mounted to swivel in the upright standard, and be provided with the usual anti-friction bearing if desired. Each of the bearings 9 carries a wheel 16 rotatably mounted between the ends of the forks.

In the structure shown, one end of the tube 14 telescopes within the free end of the longitudinal side member 13, where it is firmly secured in position by bolts or rivets 17. The opposite end of the tube 14 telescopes within the free end of the side member 12 where it may be held in a variety of adjusted positions by means of the pin 18 being passed through any two of a series of registering openings 19 formed in the sleeve 12 and through corresponding openings 20 formed in the tube 14. By reason of this construction the front and rear upright standards may be positioned at various distances from each other for the purpose of accommodating the truck to different types of automobiles and thus enable the lifting jacks to properly register with the axle of the automobile.

Mounted upon the upper end of each of the upright standards 10 is a coupling 22, which is firmly secured upon the standard, and, if desired, may be connected to the longitudinal or transverse frame member by braces 23 for the purpose of securing a more rigid structure. Upper transverse frame members 24 are secured at their ends to the upper faces of the couplings 22 in any suitable manner, and serve to connect the front and rear upright standards respectively. The upper transverse frame members, formed preferably of channelled iron construction, are provided at each end with blocks 26. Mounted upon the front and rear blocks 26 at each side of the truck are front and rear channelled iron sections 27 and 28 respectively, so constructed that the front channelled iron sections telescope within the rear channelled iron sections, the two sections upon one side of the truck forming a track and being held in proper position relative to each other by a clamping member 29 provided with lips 30 which are adapted to overlie the upper edges of the two channelled members and hold the same in slidable relation relative to each other. Bolts 25 may be passed through the channelled members, the corresponding blocks 26, the ends of the upper transverse frame members 24, and the couplings mounted upon the upper ends of the standards for holding the several parts securely in position. It will be seen that the channelled members 27 and 28, when in assembled position, provide tracks for receiving the wheels of an automobile so that an automobile can be readily placed upon the truck and removed therefrom, and transported from place to place without danger of the automobile wheels slipping from the tracks.

The outer end portions of the tracks 28 are provided with flattened portions 30' for the purpose of assisting in guiding the wheels of an automobile upon the tracks. A stop 31 is suitably secured to the outer end of each of the track sections 27, as by being bolted or riveted thereto, which serves as a limiting stop for the front wheels of the automobile, thus preventing the automobile from overrunning the tracks and falling therefrom. Lifting jacks 32 are mounted upon the upper surfaces of the upper frame members 24 at points near the ends of said frame members, slots 33 being formed in the frame members 24 to accommodate the lifting jacks in a variety of adjusted positions longitudinally of the upper frame members. Each of the lifting jacks is provided with a housing 35 within which is pivotally mounted as at 36 a lever 37, provided with the usual pawl mechanism (not shown) for engagement with the notched edge 38 of a rack 39 for lifting the racks. Each rack 39 is provided with the usual bearing portion 40, adapted for engagement with the under surface of the axle of an automobile while raising the same.

The track is particularly applicable for use with a loading dock or platform, which is raised above the track upon which the truck travels, or is so constructed that an automobile may be run thereon and the platform carrying the automobile may be raised a sufficient distance by any suitable means for bringing the automobile to the proper height for loading it upon the truck. When the automobile has been raised to a suitable height by the loading dock or platform, the truck may be wheeled near the edge of the platform and the automobile transferred to the truck, the channelled rails being adapted to receive the wheels of the automobile for holding the same in position thereon. If desired, the truck may be used without the hoist when the automobile will be run upon the elevated frame of the truck by the use of skids, one end of which is connected with the flattened ends of each of the tracks and the automobile run up the skids and upon the tracks either under its own power or by being pushed up over the skids by the men engaged in performing the work of loading the automobiles. The automobile resting on the truck can then be run into the freight car in which it is to be loaded, and the automobile may be further hoisted by means of the lifting jacks mounted on the truck, so as to be lifted and held in elevated position to facilitate the building up of a permanent blocking structure for retaining the automobile in position in the car.

When the construction of the blocking and supporting means in the car is completed, the automobile may be lowered to place thereon by means of the lifting jacks, and after the automobile is in its proper position for shipment the lifting jacks may be lowered a sufficient distance to clear the bottom portions of the axle and the truck removed. It will be seen that by forming the side portions of the frame and the longitudinal rails in such a manner that the same are extensible, the front and rear ends of the truck may be placed at a greater or less distance from each other, as may be desired for the purpose of accommodating the different types of automobiles. By arranging the lifting jacks 32 in such a manner that they are adjustable longitudinally of the transverse frame members 24, they may be readily adapted for use on different types of cars to properly distribute the weight among the several jacks, and also to so position the lifting jacks that they will not interfere with the position of the blocking structure, which is built up for the permanent support of the automobile in the car.

While we have shown and described in considerable detail a specific embodiment of our invention, it is to be understood that this showing and description is illustrative only and for the purpose of rendering our invention more clear, and that we do not regard the invention as limited to the details of the construction illustrated or described, nor any of them, except in so far as we have included such limitations within the terms of the following claims, in which it is our intention to claim all novelty inherent in our invention broadly, as well as specifically.

Having thus described our invention, what we claim as new and desire to secure by Letters Patent, is:

1. In a device of the class described, a base frame, telescoping members carried by the base frame and forming tracks for the wheels of a vehicle, transverse members connecting the telescoping members, and a plurality of lifting jacks mounted upon the transverse members and adjustable longitudinally thereof.

2. In a device of the class described, an extensible base frame, telescoping channeled rails mounted upon the base frame and adapted to serve as tracks for the wheels of a vehicle, and clamping members cooperating with the channeled rails and adapted to retain the same in position relative to each other while permitting relative longitudinal movement of the same.

3. In a device of the class described, in combination, a telescoping base frame, extensible channeled rails mounted upon the base frame and adapted to serve as tracks for the wheels of a vehicle, stops for limiting the movement of the vehicle in one direction upon the tracks, and a plurality of independently operable lifting jacks located between the channeled rails and engageable with the axles of the vehicle to lift the same from the channeled rails.

4. In a device of the class described, in combination, a telescoping base frame, telescoping channelled rails mounted on the base frame, and adapted to form tracks for the wheels of an automobile, and means for raising the vehicle from the tracks.

5. In a device of the class described, in combination, a telescoping base frame, telescoping channelled rails mounted upon the base frame, and adapted to serve as tracks for the wheels of a vehicle, stops for limiting the movement of the vehicle in one direction upon the tracks, and means for raising the vehicle from the tracks.

6. In a device of the class described, in combination, a base frame provided with upright standards at the corners thereof, telescoping channeled rails carried by the standard and adapted to support the wheels of a vehicle, stops to limit the movement of the vehicle wheels in one direction on the rails, and means for raising the vehicle wheels out of contact with the rails.

7. In a device of the class described, a pair of end frame structures, upper and lower adjustably connected members connecting said end frames, said upper members comprising channeled tracks upon which the wheels of a vehicle are adapted to be guided when moved thereon, and a plurality of lifting jacks mounted upon the end frame structures adapted for raising the wheels from said tracks.

8. In a device of the class described, a pair of end frame structures, each having upper and lower adjustably connected members adapted to permit movement of the structures toward and from each other, said upper members comprising telescoping channeled rails upon which the wheels of a vehicle are adapted to be guided when moved thereon and a plurality of lifting jacks mounted upon the structures movable transversely of the rails and adapted to lift the vehicle therefrom.

In testimony whereof we affix our signatures.

ARTHUR D. LIGHTNER.
EDWARD HOLMES.